United States Patent
Andersen

(10) Patent No.: US 9,949,498 B2
(45) Date of Patent: Apr. 24, 2018

(54) HEAT STABLE CHOCOLATE

(71) Applicant: AAK AB (publ), Malmö (SE)

(72) Inventor: Morten Daugaard Andersen, Højbjerg (DK)

(73) Assignee: AAK AB (PUBL), Malmo (SE)

( * ) Notice: Subject to any disclaimer, the term of this patent is extended or adjusted under 35 U.S.C. 154(b) by 0 days.

(21) Appl. No.: 15/103,494

(22) PCT Filed: Dec. 10, 2014

(86) PCT No.: PCT/SE2014/051480
§ 371 (c)(1),
(2) Date: Jun. 10, 2016

(87) PCT Pub. No.: WO2015/088434
PCT Pub. Date: Jun. 18, 2015

(65) Prior Publication Data
US 2016/0309734 A1    Oct. 27, 2016

(30) Foreign Application Priority Data
Dec. 10, 2013   (SE) ..................................... 1351477

(51) Int. Cl.
*A23G 1/36* (2006.01)

(52) U.S. Cl.
CPC ............ *A23G 1/36* (2013.01); *A23V 2002/00* (2013.01)

(58) Field of Classification Search
CPC ....................................................... A23G 1/36
See application file for complete search history.

(56) References Cited

U.S. PATENT DOCUMENTS

| 4,910,037 A * | 3/1990 | Sagi .......................... A23D 7/05 426/601 |
| 2008/0085358 A1 | 4/2008 | Ueyama et al. |
| 2009/0074937 A1* | 3/2009 | Gonus ....................... A23G 1/00 426/601 |

FOREIGN PATENT DOCUMENTS

| EP | 0 294 974 A2 | 12/1988 |
| EP | 1 477 071 A1 | 11/2004 |
| JP | 64-60330 | 3/1989 |
| JP | 2008-520217 A | 6/2008 |
| JP | 2008-206490 A | 9/2008 |
| WO | WO 01/06863 A1 | 2/2001 |
| WO | WO 2006/056401 A1 | 6/2006 |
| WO | WO 2006/064709 A1 | 6/2006 |
| WO | WO 2012/139574 A1 | 10/2012 |
| WO | WO2013/146834 A1 | 12/2015 |

OTHER PUBLICATIONS

Talbot, et al. "Formulation and Production of Confectionery Fats". OFI Middle East 2007 Conference and Exhibition Intercontinental CityStars Hotel, Cairo, Mar. 20-21, 2007. pp. 1-37.*
Hachiya, Iwao et al., "Seeding Effects on Solidification Behavior of Cocoa Butter and Dark Chocolate. I. Kinetics of Solidification." JAOCS, vol. 66, No. 12, pp. 1757-1762 (1989).
International Search Report and Written Opinion for International Application No. PCT/SE2014/051480, dated Mar. 30, 2015.
PCT Third Party Observation for International Application No. PCT/SE2014/051480, submitted Feb. 2, 2016.
English language abstract for JP 2008-206490 A, dated Sep. 11, 2008.
Nieburg, "AAK files patent for composition to prevent fat bloom," Confectionery news.com, 2 pages, https://www.confectionerynews.com/Article/2012/10/24/AAK-files-patent-for-composition-to-prevent-fat-bloom, (2012).
GRINDSTED® STS/SMS sorbitan ester, Dupont | Danisco, 1 page, http://www.danisco.com/product-range/emulsifiers/grindstedr-stssms/.

* cited by examiner

Primary Examiner — Jenna A Watts
(74) Attorney, Agent, or Firm — Finnegan, Henderson, Farabow, Garrett & Dunner, LLP

(57) ABSTRACT

The invention relates to a Heat stable chocolate comprising a fat phase, said fat phase of said heat stable chocolate comprising: 0.1-15% by weight of crystalline seed, 0.01-5% by weight of an emulsifier not being lecithin, said fat phase of said heat stable chocolate further comprising 25-94.9% by weight of a cocoa butter, a cocoa butter equivalent or combinations thereof, and at least 5% by weight of a cocoa butter improver, wherein said crystalline seed comprises SatOSat-triglycerides in an amount of between 40-95% by weight of said crystalline seed and StOSt-triglycerides in an amount of 30-85% by weight of said crystalline seed, wherein the main endotherm melt peak position of said crystalline seed is about 40° C. or higher when measured by Differential Scanning Calorimetry by heating samples of 10±1 mg of crystalline seed from 20° C. to 50° C. at a rate of 3° C./min to produce a melting thermogram defining said main endotherm melt peak position, and wherein Sat stands for a saturated fatty acid, St stands for stearic acid and O stands for oleic acid.

23 Claims, No Drawings

HEAT STABLE CHOCOLATE

This application is a national stage filing under 35 U.S.C. § 371 of International Application No. PCT/SE2014/051480 filed on Dec. 10, 2014, which claims benefit of the filing date of Swedish Patent No. 1351477-3, filed Dec. 10, 2013, all of which are incorporated herein by reference.

FIELD OF THE INVENTION

The invention relates to the field of chocolate products. In particular, the invention relates to chocolate products having improved heat stability, a method to produce such heat stable chocolate products and the use thereof.

BACKGROUND

Chocolate is throughout the world regarded as being one of the finest types of confectionary and various types and shapes of chocolate confectionary have been developed over the years. The innovation within the field of chocolate has been much focused on sensory aspects, such as taste, and mouth feel. However, also the visual appearance is an important aspect in the consumer's overall perception of the quality of a chocolate confectionary. Accordingly, the visual appearance of a chocolate confectionary plays a key role for the chocolate manufacturer because a less attractive appearance of the confectionary will easily be judged by the consumer to relate to a confectionary of inferior quality.

An important problem relating to the visual appearance of a chocolate confectionary is the bloom effect which may be easily recognisable on the surface of the chocolate. In case blooming has occurred, the surface of the chocolate confectionary will have a rather dull appearance having less gloss and often having clearly visible bloom crystals on the surface. The appearance of bloom, if any, typically takes place after weeks or months of storage.

Especially storage at high temperatures in warmer regions may be problematic with respect to the stability of the chocolate product.

Chocolate generally comprises cocoa butter, cocoa solids and sugar. Milk fat and other ingredients may be present in chocolate compositions as well.

In the manufacturing process of chocolate, the ingredients are mixed. The mixture is subjected to a tempering process in a tempering apparatus in which the chocolate is subjected to a carefully pre-programmed temperature profile. Subsequently, the chocolate is used for making the chocolate confectionary and the resulting confectionary is cooled following a predetermined cooling program. The tempering process serves the purpose of making a sufficient amount of a desired type of seed crystals, which in turn is responsible for obtaining a rather stable chocolate product less prone to changes in the crystal composition of the solid fats.

Bloom in chocolate is a well-studied phenomenon and among chocolate manufactures it is agreed that the bloom effect somehow is related to solid fat crystal transformations that may take place in the chocolate.

In the prior art various ways of diminishing the bloom effect in chocolates have been suggested.

Sato et al., JAOCS, Vol. 66, no. 12, 1989, describe the use of crystalline seed to accelerate the crystallization going on in cocoa butter and dark chocolate upon solidification.

JP 2008206490 discloses a tempering promoter in the form of SUS-type triglycerides, where S is a saturated fatty acid having 20 or more carbon atoms and U is an unsaturated fatty acid such as oleic acid.

EP 0 294 974 A2 describes a powdery tempering accelerator also based on SUS-type triglycerides having a total number of carbon atoms of the constituent fatty acid residues of between 50 and 56. The tempering accelerator is added, for example, as dispersion in a dispersion medium, as a seed for desired crystal formation to the chocolate during the production.

Also the addition of anti-blooming agents having specific tri-glyceride compositions is known. These anti-blooming agents may typically be based on vegetable fats obtained by chemical interesterification of triglyceride oils using certain catalysts.

Accordingly, in the art of manufacturing chocolate or chocolate-like products, there still exists a need for improving the heat stability of such products.

SUMMARY OF THE INVENTION

The invention pertains to a heat stable chocolate comprising a fat phase, said fat phase of said heat stable chocolate comprising:
0.1-15% by weight of crystalline seed,
0.01-5% by weight of an emulsifier not being lecithin,
said fat phase of said heat stable chocolate further comprising
25-94.9% by weight of a cocoa butter, a cocoa butter equivalent or combinations thereof, and
at least 5% by weight of a cocoa butter improver,
wherein said crystalline seed comprises SatOSat-triglycerides in an amount of between 40-95% by weight of said crystalline seed and StOSt-triglycerides in an amount of 30-85% by weight of said crystalline seed,
wherein the main endotherm melt peak position of said crystalline seed is about 40° C. or higher when measured by Differential Scanning Calorimetry (DSC) by heating samples of 10±1 mg of crystalline seed from 20° C. to 50° C. at a rate of 3° C./min to produce a melting thermogram defining said main endotherm melt peak position, and
wherein Sat stands for a saturated fatty acid, St stands for stearic acid and O stands for oleic acid.

In an embodiment of the invention said emulsifier not being lecithin is selected from the group consisting of polysorbates, mono-glycerides, di-glycerides, poly-glycerol esters, propylene glycol esters, sorbitan esters and any combination thereof.

In an embodiment of the invention said emulsifier not being lecithin comprises sorbitan-tri-stearate.

In a further embodiment of the invention said fat phase of said heat stable chocolate comprises cocoa butter, a cocoa butter equivalent or any combination thereof in an amount of 30-94% by weight of said fat phase, such as 40-92% by weight of said fat phase or 50-90% by weight of said fat phase.

According to embodiments of the invention said cocoa butter equivalent comprises an interesterified fat blend, a fraction of an interesterified fat blend or combinations thereof consisting of one or more of palm oil, shea butter, sal oil, fractions thereof and mixtures thereof in an amount of 0.1-15% by weight of said fat phase of said heat stable chocolate.

According to further embodiments of the invention said cocoa butter improver is selected from the group consisting of shea, sal, mango, mowra, kokum, illipe, cupuacu, fractions thereof and any combination thereof.

In an embodiment of the invention said cocoa butter improver comprises or consists of shea butter or a shea butter fraction.

According to further embodiments of the invention said cocoa butter improver is present in amount of 10-40% by weight of said fat phase, such as 12-30% by weight of said fat phase.

According to embodiments of the invention said crystalline seed comprises SatOSat in an amount of 50-93%, by weight of said crystalline seed, such as 60-90% by weight of said crystalline seed.

In further embodiments of the invention said crystalline seed comprises StOSt in an amount of 40-80% by weight of said crystalline seed, such as 45-75% by weight of said crystalline seed or 50-70% by weight of said crystalline seed.

In an embodiment of the invention said crystalline seed comprises or consists of shea stearin.

According to further embodiments of the invention the main endotherm melt peak position of said crystalline seed is 41° C. or higher, such as 42° C. or higher when measured by Differential Scanning Calorimetry by heating samples of 10±1 mg of crystalline seed from 20° C. to 50° C. at a rate of 3° C./min to produce a melting thermogram.

The invention also pertains to a method of producing a heat stable chocolate according to any of the embodiments described here above, the method comprising the steps of:
a) melting a chocolate composition comprising a fat phase, said fat phase comprising
0.01-5% by weight of an emulsifier not being lecithin,
25-94.9% by weight of a cocoa butter, a cocoa butter equivalent or combinations thereof, and
at least 5% by weight of a cocoa butter improver,
b) cooling said chocolate composition to 25° C.-39° C., and
c) adding 0.1-15% by weight of said fat phase of crystalline seed during stirring to produce a seeded chocolate.

In an embodiment of the invention the crystalline seed is added as crystalline powder, a partly molten suspension or a combination thereof.

The invention further pertains to the use of the heat stable chocolate according to any of the embodiments described here above in moulding, coating, enrobing or filling applications.

DETAILED DESCRIPTION

The invention is now described in more detail and specific embodiments of the invention are described by way of examples.

The following definitions and abbreviations apply throughout the description:
Sat=saturated fatty acid/acyl-group
U=unsaturated fatty acid/acyl-group
St=stearic acid/stearate
O=oleic acid/oleate
CB=cocoa butter
CBE=Cocoa butter equivalent
CBI=Cocoa butter improver
BR=Bloom retarding component
STS=Sorbitan-tri-stearate
MC=Milk Chocolate
DC=Dark Chocolate
DSC=Differential Scanning Calorimetry
ref=reference
co=comparative In the present context amounts given as percentage (%) are by weight (w/w %, wt %, wt. % etc.) unless stated otherwise.

In chocolate production, tempering is a troublesome process requiring specialized equipment and may be time consuming.

If a heat stable chocolate is required, subjecting the chocolate composition to a tempering process is the main route to obtain a solid fat phase that is at least somewhat heat stable with respect to, for example, bloom.

According to the present invention, such tempering process may be partly or fully omitted by using a crystalline seed together with emulsifier and a cocoa butter improver in the chocolate composition whereby heat stability is obtained even without tempering.

The invention relates to a heat stable chocolate comprising a fat phase, said fat phase of said heat stable chocolate comprising:
0.1-15% by weight of crystalline seed,
0.01-5% by weight of an emulsifier not being lecithin,
said fat phase of said heat stable chocolate further comprising
25-94.9% by weight of a cocoa butter, a cocoa butter equivalent or combinations thereof, and
at least 5% by weight of a cocoa butter improver,
wherein said crystalline seed comprises SatOSat-triglycerides in an amount of between 40-95% by weight of said crystalline seed and StOSt-triglycerides in an amount of 30-85% by weight of said crystalline seed,
wherein the main endotherm melt peak position of said crystalline seed is about 40° C. or higher when measured by Differential Scanning Calorimetry by heating samples of 10±1 mg of crystalline seed from 20° C. to 50° C. at a rate of 3° C./min to produce a melting thermogram defining said main endotherm melt peak position, and
wherein Sat stands for a saturated fatty acid, St stands for stearic acid and O stands for oleic acid.

It has been found that a heat stable chocolate can be obtained by adjusting the fat phase of the chocolate to comprise crystalline seed based on SatOSat triglycerides. The best results with respect to heat stability are obtained when the fat phase of the chocolate also comprises a cocoa butter improver and an emulsifier not being lecithin.

Surprisingly, a synergy with respect to obtaining heat stability of the chocolate exists between different components in the chocolate. This has been discovered by the present inventor. By combining crystalline seed based on SatOSat-triglycerides of which at least a part is StOSt with emulsifier not being lecithin and a cocoa butter improver in the chocolate, an improved heat stability of the resulting chocolate may be obtained when compared to standard tempered chocolate or chocolate comprising only one or two of the mentioned chocolate components.

Thus, according to the invention, the crystalline seed comprises StOSt-triglycerides in an amount of between 30-85% by weight of the crystalline seed. The StOSt-triglycerides are a part of the SatOSat-triglycerides, the SatOSat-triglycerides comprising 40-95% by weight of the crystalline seed.

This means that, for example, in an embodiment where the SatOSat-content in the crystalline seed is 50% by weight of the crystalline seed, and the StOSt-content in the crystalline seed is 45% by weight of the crystalline seed, there are 5% by weight of the crystalline seed of SatOSat-triglycerides other than StOSt-triglycerides in the crystalline seed.

The improved heat stability is observed for chocolate comprising cocoa butter, a cocoa butter equivalent or combinations thereof.

The improvement becomes evident when comparing heat stable chocolate according to embodiments of the invention with prior art chocolate or chocolate not comprising all three of seed, emulsifier (not being lecithin) and CBI. This comparison may be made for example by comparing the tendency for surface bloom for the different chocolates.

The crystalline seed material may be manufactured in different ways as long as the main endotherm melt peak position of said crystalline seed is about 40° C. or higher when measured by Differential Scanning Calorimetry by heating samples of 10±1 mg of crystalline seed from 20° C. to 50° C. at a rate of 3° C./min to produce a melting thermogram defining said main endotherm melt peak position. If the melting temperature of the crystalline seed is considerably lower than about 40° C., the heat stability of the chocolate may be compromised.

Seeding technology is known within the chocolate art. Crystalline seed as described herein may be obtained by various processes known to the skilled person.

One method for obtaining suitable seed material having a main endotherm melt peak position of about 40° C. or higher may be to melt the vegetable fat comprised in the seed composition or fractions thereof by applying heat, followed by storage of the vegetable fat or fractions thereof at a temperature lower than about 40° C., for example at about 37° C., for about 20 hours.

Samples of crystalline seed were analyzed by METTLER TOLEDO DSC 823$^e$ with a HUBER TC45 immersion cooling system.

10±1 mg of sample were hermetically sealed in a 40 μL aluminum pan, with an empty pan as reference. Samples were initially held at 20.0° C. for 2 min. Samples were then heated to 50.0° C. at 3° C./min to produce a melting thermogram defining the main endotherm melt peak position.

Since the main endotherm melt peak position is an objective physical property of the crystalline seed material, the exact DSC-method is not critical. Other methods known in the art may be used.

In an embodiment of the invention said emulsifier not being lecithin is selected from the group consisting of polysorbates, mono-glycerides, di-glycerides, poly-glycerol esters, propylene glycol esters, sorbitan esters and any combination thereof.

In an embodiment of the invention said emulsifier not being lecithin comprises sorbitan-tri-stearate.

It has surprisingly been found that sorbitan-tri-stearate promotes the heat stability when applied together with crystalline seed and CBI in a chocolate.

In an embodiment of the invention said fat phase of said heat stable chocolate comprises cocoa butter, a cocoa butter equivalent or any combination thereof in an amount of 30-94% by weight of said fat phase, such as 40-92% by weight of said fat phase or 50-90% by weight of said fat phase.

The heat stable chocolate may comprise CB and/or CBE making up a substantial part of the fat phase of the heat stable chocolate.

According to embodiments of the invention said cocoa butter equivalent comprises an interesterified fat blend, a fraction of an interesterified fat blend or combinations thereof consisting of one or more of palm oil, shea butter, sal oil, fractions thereof and mixtures thereof in an amount of 0.1-15% by weight of said fat phase of said heat stable chocolate.

In some embodiments the CBE comprises interesterified fat. The interesterification may be done by chemical interesterification or enzymatic interesterification.

Interesterification may produce particularly useful fats promoting a better shelf life.

According to further embodiments of the invention said cocoa butter improver is selected from the group consisting of shea, sal, mango, mowra, kokum, illipe, cupuacu, fractions thereof and any combination thereof.

Several natural sources are available to establish a CBI. Functions of the CBI can be many, including improvements of the chocolate with respect to heat stability and sensory properties. CBI may raise the melting point of the chocolate due to a higher solid fat content when compared to CB.

According to an embodiment of the invention said cocoa butter improver comprises or consists of shea butter or a shea butter fraction.

CBI based on shea butter or fractions thereof may have excellent properties with respect to improving the heat stability of seeded chocolate.

CBI alone may often have a heat stabilizing effect when added to chocolate. Surprisingly, when the CBI is used in seeded chocolate together with emulsifier not being lecithin, advantageous embodiments of the invention are obtained, wherein the heat stability of the chocolate is further improved.

In an embodiment of the invention said cocoa butter improver is present in amount of 10-40% by weight of said fat phase, such as 12-30% by weight of said fat phase.

According to the invention, CBI should always be present in an amount of at least 5% of the fat phase in the chocolate. In some embodiments CBI may be added up to 40% by weight of the fat phase or 35% by weight of the fat phase.

Among other things, texture parameters may play a role in deciding the optimum amount of CBI in the chocolate. Below 5% of CBI in the fat phase of the chocolate, the obtainable heat stability may be compromised. Above 40% of CBI in the fat phase, the chocolate may become too hard and provide an unpleasant mouth-feel.

In an embodiment of the invention said crystalline seed comprises SatOSat in an amount of 50-93%, by weight of said crystalline seed, such as 60-90% by weight of said crystalline seed.

The role of the crystalline seed in the chocolate is to promote heat stability of the chocolate. It has been found that desired crystallization of chocolate fats rich in SatOSat may be best promoted by crystalline seed of a similar tri-glyceride composition.

In an embodiment of the invention said crystalline seed comprises StOSt in an amount of 40-80% by weight of said crystalline seed, such as 45-75% by weight of said crystalline seed or 50-70% by weight of said crystalline seed. It has been found that crystalline seed rich in StOSt is well suited for the heat stable chocolate according to advantageous embodiments of the invention. The reason for this may be that both CB and also many CBE's are rich in StOSt.

In an embodiment of the invention said crystalline seed comprises or consists of shea stearin.

Crystalline seed comprising or consisting of shea stearin may be particularly advantageous. It has been found that there is an excellent compatibility of such crystalline seed with both CB and CBE and an excellent texture of the chocolate may be provided.

In further embodiments of the invention the main endotherm melt peak position of said crystalline seed is 41° C. or higher, such as 42° C. or higher when measured by Differential Scanning Calorimetry by heating samples of 10±1 mg of crystalline seed from 20° C. to 50° C. at a rate of 3° C./min to produce a melting thermogram. The main endotherm melt peak position of the crystalline seed indicates the heat stability of the seed crystals and thereby indirectly may reflect the heat stability obtainable when the crystalline seed is added to chocolate.

The invention also relates to a method of producing a heat stable chocolate according to claim 1 comprising the steps of:
a) melting a chocolate composition comprising a fat phase, said fat phase comprising
   0.01-5% by weight of an emulsifier not being lecithin,
   25-94.9% by weight of a cocoa butter, a cocoa butter equivalent or combinations thereof, and
   at least 5% by weight of a cocoa butter improver,
b) cooling said chocolate composition to 25-39° C., and
c) adding 0.1-15% by weight of said fat phase of crystalline seed during stirring to produce a seeded chocolate.

When melting the chocolate composition, all fat crystals in the composition may be melted. When cooling, new fat crystals may form and by adding crystalline seed, the formation of more heat-stable crystals may be promoted.

According to embodiments of the invention the crystalline seed is added as crystalline powder, a partly molten suspension or a combination thereof. The addition of crystalline seed may pose some technical challenges on the process design. In principle, the crystalline seed may be added in any way that can be conveniently integrated in the process design for producing the chocolate.

The invention further relates to the use of the heat stable chocolate according to any of the embodiments described herein or produced by the method described herein for moulding, coating, enrobing or filling applications.

The heat stable chocolate according to embodiments of the present invention is useful in any application, where heat stability may be an advantage or an important feature. This may particularly be true for applications where the chocolate is used or stored in environments above ambient temperatures of about 20° C. or 25° C.

Especially, if storage temperatures intermittently become very high, such as above about 33° C. or above about 35° C. or even above about 37° C., for example when the chocolate is stored in a car on a hot summer day, the heat stable chocolate according to embodiments of the invention may perform exceptionally well and preserve a good product when temperatures get lower again and the chocolate is to be consumed.

EXAMPLES

The invention is now illustrated by way of examples.

Example 1

Milk Chocolate (=MC) and Dark Chocolates (=DC) of Reference-(=Ref), Comparative-(=Co) and Inventive Compositions Tables 1 and 2 below show the recipes and the fat compositions for milk chocolates and dark chocolates, respectively.

The sum deviation from precisely 100% is due to round offs of the amount of individual components.

The total fat content in the recipe is calculated as the sum of shea stearin, CB, fat content of the cocoa mass (approx. 56% CB in cocoa mass), milk fat and the fat content of skim milk powder.

Emulsifier (here STS), when added, is thus present in an amount of approx. 2% by weight of the total fat content.

The BR (=Bloom retarding component) is an interesterified palm and shea based fraction.

The milk chocolates I, II, III and dark chocolates I, II, III were all hand tempered on marble table and used for 20 gram chocolate bars.

The molten milk chocolates IV, V, VI, VII and dark chocolate IV were stirred in an open bowl with water jacket at 33° C. The seed, in a powdery state with a mean particle of approx. 20 μm, was added to the chocolates and mixing commenced for 20 minutes. Thereafter, the chocolates were poured into 20 gram chocolate bar moulds The moulds were subsequently cooled in a three zones cooling tunnel for 30 minutes at a temperature of 15° C. followed by a temperature at 12° C. followed by a temperature of 15° C.

Weight percentages in the below tables 1 and 2 refer to the total recipe and to the fat composition, respectively.

TABLE 1

Recipes and fat compositions for milk chocolates

| | MC I (ref) | MC II (co) | MC III (co) | MC IV | MC V (co) | MC VI (co) | MC VII |
|---|---|---|---|---|---|---|---|
| Recipe | | | | | | | |
| Overall Fat | CB | CB + CBI | CB + CBI + STS | CB + CBI + Seed + STS | CB + CBI + Seed | CB + Seed + STS | CB + CBI + BR + Seed + STS |
| Seed (% w/w) | | | | 1 | 1 | 1 | 1 |
| Shea Stearin (% w/w) | | 6 | 6 | 4 | 4 | | 4 |
| BR (% w/w) | | | | | | | 1 |
| CB (% w/w) | 18 | 12 | 12 | 13 | 13 | 17 | 12 |
| Cocoa mass (% w/w) | 10 | 10 | 10 | 10 | 10 | 10 | 10 |

TABLE 1-continued

Recipes and fat compositions for milk chocolates

| | MC I (ref) | MC II (co) | MC III (co) | MC IV | MC V (co) | MC VI (co) | MC VII |
|---|---|---|---|---|---|---|---|
| Sugar (% w/w) | 49 | 49 | 49 | 49 | 49 | 49 | 49 |
| Skim milk powder (% w/w) | 17 | 17 | 17 | 17 | 17 | 17 | 17 |
| Milk fat (% w/w) | 5 | 5 | 5 | 5 | 5 | 5 | 5 |
| Lecithin (% w/w) | 0.5 | 0.5 | 0.5 | 0.5 | 0.5 | 0.5 | 0.5 |
| STS (% w/w) | | | 0.6 | 0.6 | | 0.6 | 0.6 |
| Sum | (99.5) | (99.5) | (100.1) | (101.1) | (99.5) | (100.1) | (100.1) |
| Fat composition | | | | | | | |
| Seed (% w/w) | | | | 3 | 3 | 3 | 3 |
| Shea Stearin (% w/w) | | 20 | 20 | 15 | 15 | | 15 |
| BR (% w/w) | | | | | | | 3 |
| CB (% w/w) | 82 | 62 | 62 | 64 | 64 | 79 | 61 |
| Milk fat (% w/w) | 18 | 18 | 18 | 18 | 18 | 18 | 18 |
| Total fat content (% w/w) | 29.4 | 29.4 | 29.4 | 30.0 | 30.0 | 30.0 | 30.0 |

TABLE 2

Recipes and the fat compositions for the dark chocolates.

| | DC I (ref) | DC II (co) | Dark C III (co) | DC IV |
|---|---|---|---|---|
| Recipe | | | | |
| Overall fat composition | CB | CB + CBI | CB + CBI + STS | CB + CBI + Seed + STS |
| Seed (% w/w) | | | | 1 |
| Shea Stearin (% w/w) | | 6 | 6 | 4 |
| CB (% w/w) | 7 | 1 | 1 | 2 |
| Cocoa mass (% w/w) | 40 | 40 | 40 | 40 |
| Sugar (% w/w) | 50 | 50 | 50 | 50 |
| Milk fat (% w/w) | 2 | 2 | 2 | 2 |
| Lecithin (% w/w) | 0.5 | 0.5 | 0.5 | 0.5 |
| STS (% w/w) | | | 0.6 | 0.6 |
| Sum | (99.5) | (99.5) | (100.1) | (100.1) |
| Fat composition | | | | |
| Seed (%) | | | | 3 |
| Shea Stearin (%) | | 20 | 20 | 15 |
| CB (%) | 93 | 73 | 73 | 75 |
| Milk fat (%) | 7 | 7 | 7 | 7 |
| Total fat content (% w/w) | 32.1 | 32.1 | 32.1 | 32.8 |

Example 2

Bloom Stability of Chocolate Bars of Milk- and Dark Chocolate

After 7 days storage at 20° C. chocolate bars form Example 1 were placed in a programmable temperature cabinet and subjected to heat treatment at a high temperature for 8 hours followed by a low temperature for 16 hours. This heat treatment were performed either once or five consecutive times. The high temperatures were between 35 to 37±0.5° C. and the low temperatures were between 20 to 25±0.5° C.

The chocolate bars were examined for bloom after one and five heat treatments.

Table 3 below illustrates the test result in respect of bloom effect observed for milk chocolate bars of Example 1, table 1, after one heat treatment under different high- and low temperature settings.

TABLE 3

Bloom on milk chocolate samples

| Heat treatment | MC I (ref) | MC II (co) | MC III (co) | MC IV | MC V (co) | MC VI (co) | MC VII |
|---|---|---|---|---|---|---|---|
| 37 –25° C. | – | – | – | ++ | – | – | ++ |
| 37 –24° C. | – | – | – | ++ | – | – | ++ |
| 37 –23° C. | – | + | – | ++ | – | – | ++ |
| 37 –20° C. | – | ++ | – | ++ | – | – | ++ |
| 35 –25° C. | – | + | – | ++ | – | + | ++ |
| 35 –24° C. | – | + | + | ++ | – | + | ++ |
| 35 –23° C. | – | ++ | ++ | ++ | – | ++ | ++ |
| 35 –20° C. | – | ++ | ++ | ++ | – | ++ | ++ |

Table 4 below illustrates the test result in respect of bloom effect observed for dark chocolate bars of table 2 after one heat treatment under different high- and low temperature settings.

TABLE 4

Bloom on dark chocolate samples

| Heat treatment | DC I (ref) | DC II (co) | DC III (co) | DC IV |
|---|---|---|---|---|
| 37-25° C. | – | – | – | ++ |
| 37-24° C. | – | + | – | ++ |
| 37-23° C. | – | + | – | ++ |
| 37-20° C. | – | ++ | – | ++ |
| 35-25° C. | – | ++ | ++ | ++ |
| 35-24° C. | + | ++ | ++ | ++ |
| 35-23° C. | + | ++ | ++ | ++ |
| 35-20° C. | ++ | ++ | ++ | ++ |

In tables 3 and 4,

"++" denotes a glossy and un-bloomed chocolate surface

"+" denotes a dull but un-bloomed chocolate surface

"–" denotes a bloomed chocolate surface

The data in Table 3 show that samples MC IV and MC VII exhibit very good bloom stability under all tested conditions. Clearly, the presence of all three of CBI, emulsifier (in this case STS) and seed is required to obtain consistently good results.

The data in Table 4 confirm that the presence of all three of CBI, emulsifier (in this case STS) and seed is required to obtain consistently good results, see sample DC IV.

It should be noted that in this experiment, DC II had better bloom stability than DC III, indicating the presence of a synergy between CBI, emulsifier (in this case STS) and seed when incorporated together as is the case in DC IV. Purely additive effects would suggest that DC III should obtain better results than DC II.

A similar observation holds for samples MC II and MC III in table 3 when compared to MC IV and MC VII.

Furthermore, selections of the un-bloomed chocolate bars after heat treatments at 37-25° C. were placed in bloom cabinets for bloom tests. The samples were tested under isothermal temperature conditions of 25° C.

Table 5 below illustrates the test result in respect of bloom effect observed for milk chocolate bars after one and five consecutive heat treatments at 37-25° C. stored at 25° C. isothermal condition.

TABLE 5

Bloom data for milk chocolate samples after heat cycle treatments followed by isothermal storage.

| | MC IV Number of weeks until first appearance of bloom | MC VII Number of weeks until first appearance of bloom |
|---|---|---|
| One 37-25° C. heat treatment | | |
| 25° C. isotherm. | >26 | >26 |
| Five 37-25° C. heat treatments | | |
| 25° C. isotherm. | >26 | >26 |

The data in table 5 indicate very good bloom resistance of MC IV and MC VII after heat cycle treatment followed by isothermal storage at 25° C.

Even after 26 weeks, no visible bloom is observed on the samples.

The invention claimed is:

1. A heat stable chocolate comprising a fat phase, the fat phase comprising:
   0.1-15% by weight of crystalline seed,
   0.01-5% by weight of an emulsifier not being lecithin,
   25-94.9% by weight of a cocoa butter, a cocoa butter equivalent or combinations thereof, and
   at least 5% by weight of a cocoa butter improver;
   wherein the crystalline seed comprises SatOSat-triglycerides in an amount of between 40-95% by weight of the crystalline seed and StOSt-triglycerides in an amount of 30-85% by weight of the crystalline seed,
   wherein the main endotherm melt peak position of the crystalline seed is about 40° C. or higher when measured by Differential Scanning Calorimetry by heating samples of 10±1 mg of crystalline seed from 20° C. to 50° C. at a rate of 3° C./min to produce a melting thermogram defining the main endotherm melt peak position, and wherein Sat stands for a saturated fatty acid, St stands for stearic acid and O stands for oleic acid.

2. The heat stable chocolate of claim 1, wherein the emulsifier not being lecithin is selected from the group consisting of polysorbates, mono-glycerides, di-glycerides, poly-glycerol esters, propylene glycol esters, sorbitan esters and any combination thereof.

3. The heat stable chocolate of claim 1, wherein the emulsifier not being lecithin comprises sorbitan-tri-stearate.

4. The heat stable chocolate of claim 1, wherein the fat phase comprises cocoa butter, a cocoa butter equivalent or any combination thereof in an amount of 30-94% by weight of the fat phase.

5. The heat stable chocolate of claim 1, wherein the cocoa butter equivalent comprises an interesterified fat blend, a fraction of an interesterified fat blend or combinations thereof consisting of one or more of palm oil, shea butter, sal oil, fractions thereof and mixtures thereof in an amount of 0.1-15% by weight of the fat phase.

6. The heat stable chocolate of claim 1, wherein the cocoa butter improver is selected from the group consisting of shea, sal, mango, mowra, kokum, illipe, cupuacu, fractions thereof and any combination thereof.

7. The heat stable chocolate of claim 1, wherein the cocoa butter improver comprises or consists of shea butter or a shea butter fraction.

8. The heat stable chocolate of claim 1, wherein the cocoa butter improver is present in an amount of 10-40% by weight of the fat phase.

9. The heat stable chocolate of claim 1, wherein the crystalline seed comprises SatOSat in an amount of 50-93% by weight of the crystalline seed.

10. The heat stable chocolate of claim 1, wherein the crystalline seed comprises StOSt in an amount of 40-80% by weight of the crystalline seed.

11. The heat stable chocolate of claim 1, wherein the crystalline seed comprises or consists of shea stearin.

12. The heat stable chocolate of claim 1, wherein the main endotherm melt peak position of the crystalline seed is 41° C. or higher when measured by Differential Scanning calorimetry by heating samples of 10±1 mg of crystalline seed from 20° C. to 50° C. at a rate of 3° C./min to produce a melting thermogram.

13. A method of producing the heat stable chocolate of claim 1 comprising the steps of:
  a) melting a chocolate composition comprising a fat phase, the fat phase comprising 0.01-5% by weight of an emulsifier not being lecithin,
  25-94.9% by weight of a cocoa butter, a cocoa butter equivalent or combinations thereof, and
  at least 5% by weight of a cocoa butter improver,
  b) cooling the chocolate composition to 25-39° C., and
  c) adding 0.1-15% by weight of the fat phase of crystalline seed during stirring to produce a seeded chocolate.

14. The method of claim 13, wherein the crystalline seed is added as crystalline powder, a partly molten suspension or a combination thereof.

15. The heat stable chocolate of claim 1, wherein the heat stable chocolate is used for moulding, coating, enrobing or filling applications.

16. The method of claim 13, wherein the heat stable chocolate is used for moulding, coating, enrobing or filling applications.

17. The heat stable chocolate of claim 4, wherein the fat phase comprises cocoa butter, a cocoa butter equivalent or any combination thereof in an amount of 40-92% by weight of the fat phase.

18. The heat stable chocolate of claim 17, wherein the fat phase comprises cocoa butter, a cocoa butter equivalent or any combination thereof in an amount of 50-90% by weight of the fat phase.

19. The heat stable chocolate of claim 8, wherein the cocoa butter improver is present in an amount of 12-30% by weight of the fat phase.

20. The heat stable chocolate of claim 9, wherein the crystalline seed comprises SatOSat in an amount of 60-90% by weight of the crystalline seed.

21. The heat stable chocolate of claim 10, wherein the crystalline seed comprises StOSt in an amount of 45-75% by weight of the crystalline seed.

22. The heat stable chocolate of claim 21, wherein the crystalline seed comprises StOSt in an amount of 50-70% by weight of the crystalline seed.

23. The heat stable chocolate of claim 12, wherein the main endotherm melt peak position of the crystalline seed is 42° C. or higher when measured by Differential Scanning Calorimetry by heating samples of 10±1 mg of crystalline seed from 20° C. to 50° C. at a rate of 3° C./min to produce a melting thermogram.

* * * * *